July 8, 1941.  K. WEBER  2,248,143
FLAT GLASS BEVELING AND EDGING APPARATUS
Filed March 10, 1939   4 Sheets-Sheet 1
Fig. 1
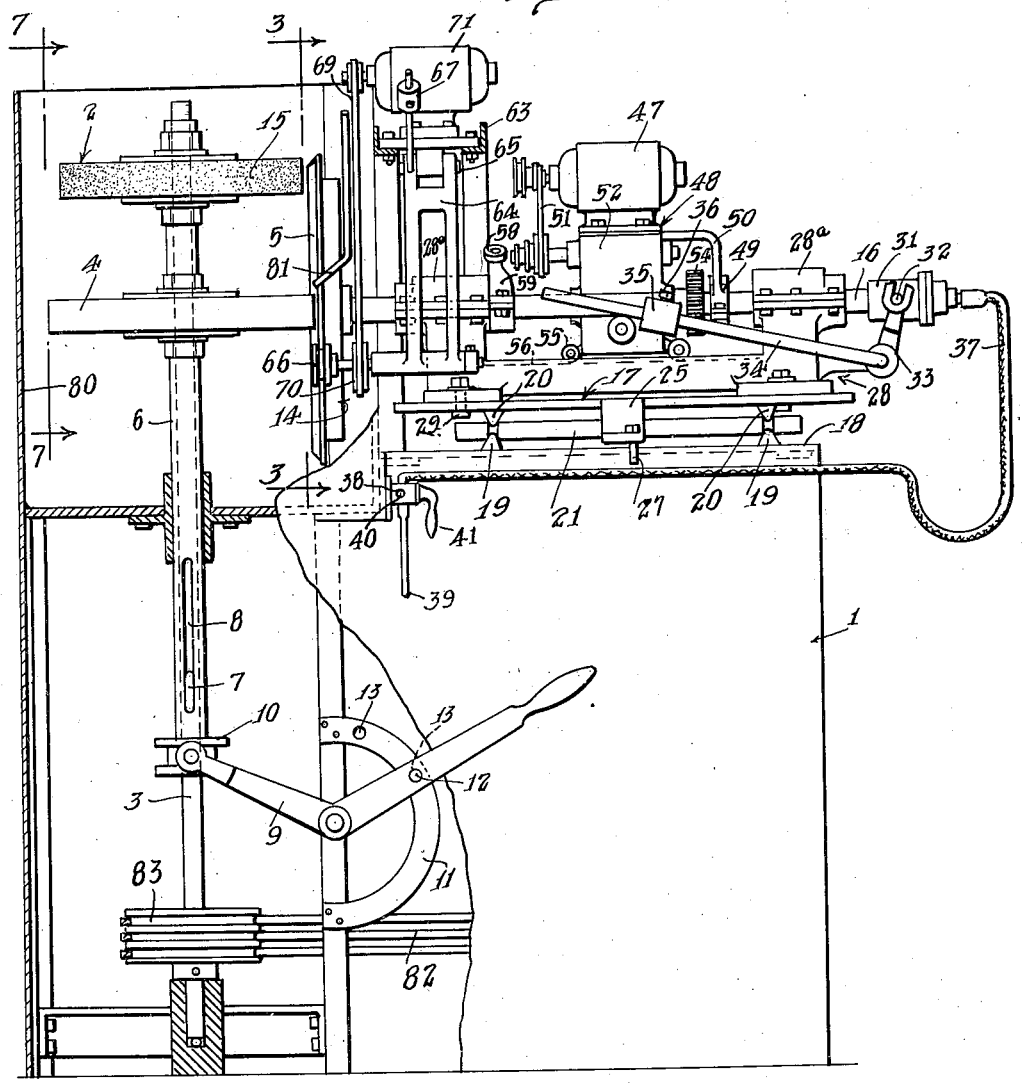
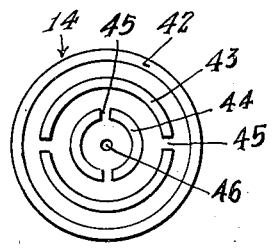
Fig. 5
Inventor
Karl Weber
By Lyon & Lyon
Attorneys

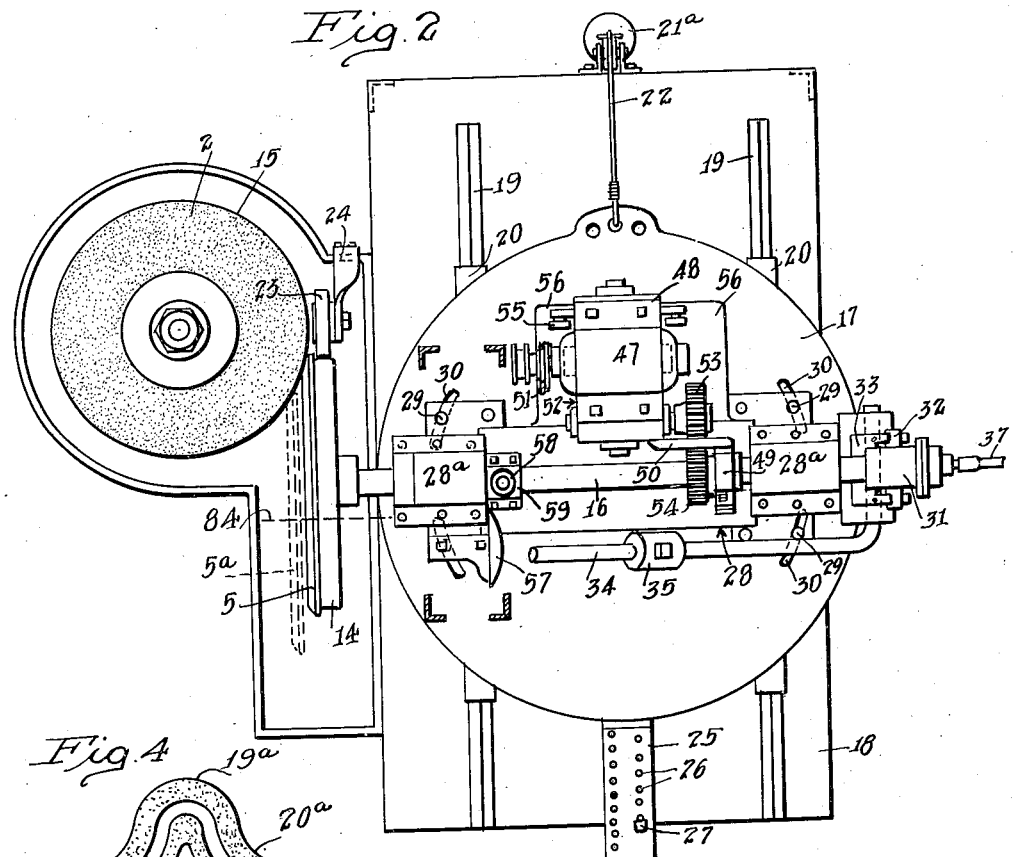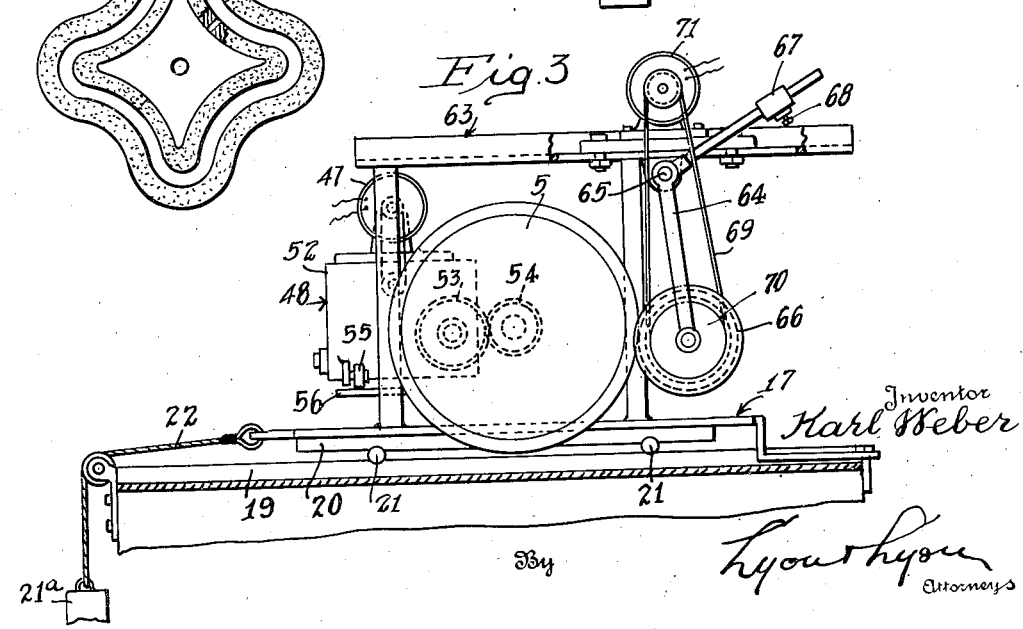

July 8, 1941.  K. WEBER  2,248,143
FLAT GLASS BEVELING AND EDGING APPARATUS
Filed March 10, 1939  4 Sheets-Sheet 3
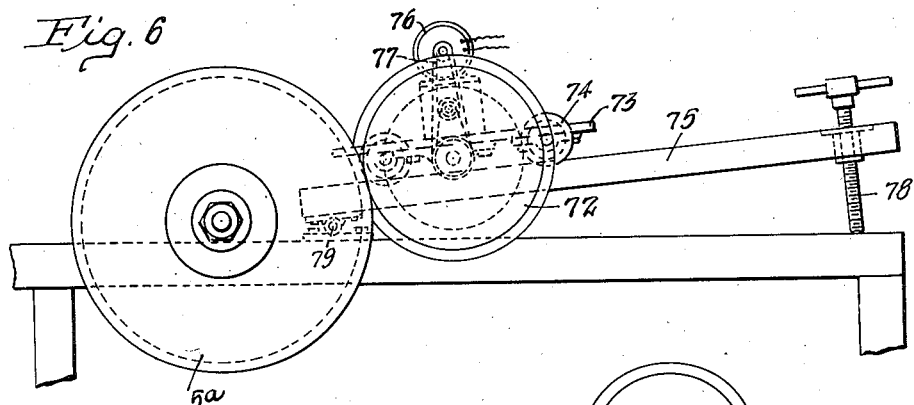
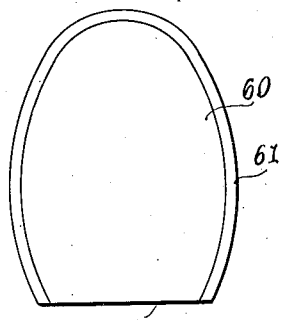
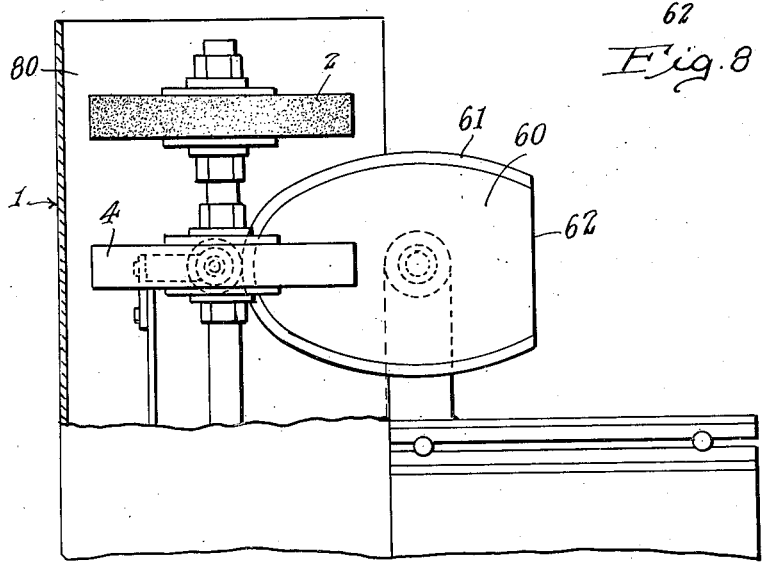
Inventor
Karl Weber
By Lyon & Lyon
Attorneys July 8, 1941.    K. WEBER    2,248,143
FLAT GLASS BEVELING AND EDGING APPARATUS
Filed March 10, 1939    4 Sheets-Sheet 4
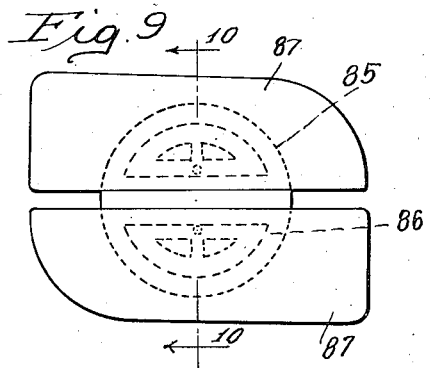
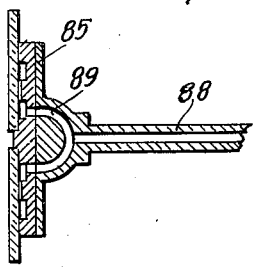
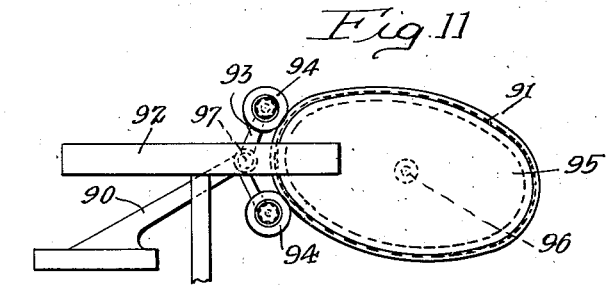
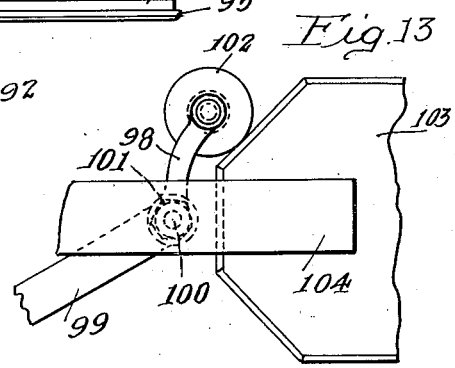
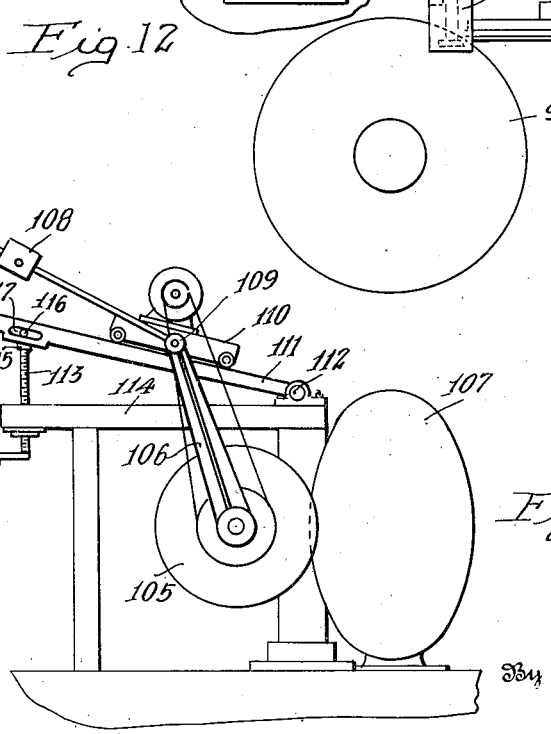
Inventor
Karl Weber
By Lyon+Lyon
Attorneys Patented July 8, 1941

2,248,143

UNITED STATES PATENT OFFICE 2,248,143

FLAT GLASS BEVELING AND EDGING APPARATUS

Karl Weber, Los Angeles, Calif., assignor to Weber Showcase & Fixture Co., Inc., Los Angeles, Calif., a corporation of Delaware Application March 10, 1939, Serial No. 261,002

7 Claims. (Cl. 51—101)

This invention relates to a machine for beveling and finishing the bevels on the edges of glass sheets or plates. The present specification describes the invention as applied to a machine for beveling, edging, and polishing, glass plates of curved outline. Such beveled glass plates are usually silvered after being beveled, to transform them into mirrors. It is now common practice to bevel the edges of glass sheets by hand, the operator holding the glass in an inclined position applied to the horizontal upper face of an abrading wheel. With the glass in this position, he gradually rotates the glass or "rolls" it on the face of the abrading wheel to form the bevel. It requires, of course, a highly skilled workman to perform this operation by hand. It is sometimes desired to form a mirror with a bevel at a different angle from normal, and in order to change the angle of the bevel in this way, a further call is made upon the skill of the beveler. Sometimes it is necessary to bevel and finish the edges of glass plates having unusual designs, and not presenting a continuous convex edge. In accordance with the usual practice of beveling a plate on the upper face of a horizontally rotating abrading wheel, it is, of course, impossible to form a continuous bevel on a plate having a concave edge at any point in the periphery.

A principal object of this invention is to produce a glass-beveling apparatus of simple construction, which will be capable of beveling and edging glass of various shapes; for example, circular, elliptical, or special forms of design including concave curvilinear edges; or a special design of glass where the glass is of substantially elliptical form but cut across at one end by a chord. Mirrors of this special form have some vogue for use in connection with dressing-tables. The chord end of the mirror is located at about the level of the table.

A further object of the invention is to produce an apparatus of this kind, in which the construction is such as to adapt the apparatus readily for forming bevels of different degrees.

In accordance with the present practice, the operations of grinding the bevel, finishing the edge, and polishing the bevel, are performed on three separate machines, or sometimes on the same machine by effecting alterations in it. One of the objects of this invention is to provide an apparatus of this kind, of simple construction, in which the operations of grinding a bevel, finishing its edge, and polishing the bevel, may be all accomplished on the same machine.

In the apparatus described in the following specification, a rotary carrier head is provided mounted for rotation, and also mounted for movement toward the peripheral face of the abrading wheel that grinds the bevel. One of the objects of this invention is to provide simple means for mounting the driving motor and driving mechanism for rotating the carrier head, and at the same time permitting the movements of the carrier head toward or away from the face of the beveling wheel, and facilitating the withdrawal or shifting movement of the carrier head that is necessary to enable the plate to be beveled, to be placed on the carrier head or removed.

A further object of the invention is to provide a machine of this type with a carriage for supporting the carrier head, which will cooperate with means for enabling plates of special design to be beveled.

A further object of the invention is to provide a construction for the carrier head, which will enable a plurality of flat sheets or plates of glass to be held and beveled or edged simultaneously.

A further object of the invention is to provide means associated with the bevel grinder, to guide the glass sheet or plate that is being beveled, in such a way as to present its edge to the grinding wheel to form the bevel, and to accomplish this without the necessity of employing a cam for this purpose; also to provide such a device which will enable an angular form such as octagonal, or other angular forms of sheets, to be beveled.

One of the features of the invention is the provision of means for finishing the edge of glass sheets or plates; and one of the objects of the invention is to provide improved means for yieldingly holding the edging wheel against the periphery of the sheet that is being finished.

Further objects of the invention will appear hereinafter.

The invention consists in the novel parts and combination of parts to be described hereinafter, all of which contribute to produce an efficient flat glass beveling and edging apparatus.

A preferred embodiment of the invention is described in the following specification, while the broad scope of the invention is pointed out in the appended claims.

In the drawings:

Fig. 1 is a side elevation in partial section, of a machine embodying my invention.

Fig. 2 is a plan of the machine illustrated in

Fig. 1, certain parts being shown in cross-section.

Fig. 3 is a vertical section taken about on the line 3—3 of Fig. 1, certain parts being omitted or broken away. This view particularly illustrates details of the mounting for the carriage, and also illustrates an edger for finishing the beveled edge after it has been formed on the glass.

Fig. 4 is a front elevation illustrating a carrier head of special design, enabling a glass of this pattern to be beveled.

Fig. 5 is a front elevation of a carrier head of circular form, and particularly illustrating the preferred construction of this head where sheets of glass of unusually large size are to be beveled.

Fig. 6 is a side elevation illustrating edger mechanism for finishing a beveled edge in which the finishing wheel rests by gravity against the edge of the glass. In this view the left-hand portion of the frame is broken away.

Fig. 7 is a vertical section taken about on the line 7—7 of Fig. 1, and illustrating a polisher or burnisher wheel in operative position to cooperate with the carrier head in polishing the bevel of a glass of special design.

Fig. 8 is a front elevation illustrating a special design of a sheet of glass that can be beveled on this machine.

Fig. 9 is a front elevation illustrating a special type of carrier head that I may employ, which enables a plurality of glass sheets or plates to be carried alongside of each other on the carrier head, and finished simultaneously.

Fig. 10 is a vertical section taken on the line 10—10 of Fig. 9, and further illustrating the construction of the carrier head illustrated in Fig. 9.

Fig. 11 is a front elevation corresponding to Fig. 7, of a diagrammatic nature, illustrating means for cooperating with the edge of the glass sheet to assist in presenting its edge to the beveling wheel, and avoiding the necessity for utilizing a portion of the carrier head as a cam to control the position of the glass with respect to the beveling wheel.

Fig. 12 is a plan of the parts illustrated in Fig. 11, and further illustrating their relation. In this view a portion of the table of the machine that supports a bracket is represented broken away.

Fig. 13 is a view corresponding to Fig. 11, and illustrating a somewhat similar means for guiding the edge of a glass sheet of angular form in cooperating with the beveling wheel. In this view the supporting arm for the guide roller and also the grinding wheel, is broken away.

Fig. 14 is a view corresponding to Fig. 3; that is to say, illustrating the same general type of edging wheel and having a special construction affording a yielding support for a pivoted arm, in which the support for the arm tends to approach the location of the glass sheet that is being edged.

In practicing the invention, I provide a machine frame including a casing 1. Adjacent to, or housed within, this casing, I provide means for rotatably supporting an abrading wheel 2. This wheel is preferably mounted to rotate in a horizontal plane, and in the present drawings, is illustrated as mounted upon a shaft 3. Although, if desired, the abrading wheel 2 can be attached directly to its shaft 3, in the present specification I prefer to provide a polishing wheel 4 to be associated with the wheel 2, so that either one of these wheels can be utilized to work upon the edge of the glass plate 5. For this purpose these two wheels 2 and 4 can be attached to a tubular outer shaft 6, which is connected by a spline 7 and slot 8 to the inner shaft 3. In other words, I provide a construction which enables a shift to be made to apply either one of these wheels to the plate. In the present instance, this is accomplished by providing a bell crank lever 9, one arm of which operates a collar 10 on the lower end of the tubular shaft. This bell crank lever 9 cooperates with a quadrant 11 having means for holding the collar 10 in a raised position as illustrated, or in a depressed position. As illustrated in Fig. 1, the wheel 4 is in line with the axis of the plate 5, but in the lower position of the collar 10 the upper, abrading wheel 2 would be about in line with the axis of the rotating plate 5. A removable pin 12 cooperates with two sockets 13 in the quadrant, to enable the shaft 6 to be shifted into these two operative positions.

The plate 5 to be beveled, is mounted upon a rotatable carrier head, and means is provided to enable this carrier head to be shifted toward the axis of the two wheels 2 and 4 to enable the edge of the glass 5 to be applied to the peripheral face or edge face 15 of the abrading wheel, as illustrated in Fig. 2. In connection with Figs. 1 and 2, however, it should be understood that in Fig. 1 the position of the wheels 2 and 4 does not agree with Fig. 2; that is to say, Fig. 2 illustrates the wheel 2 in its active position.

The carrier head 14 is preferably a pneumatic suction head such as used in machines of this type, and for this purpose is attached to the forward end of a tubular shaft 16; that is to say, a shaft having a duct through it for maintaining a partial vacuum when desired on the face of the carrier head. The shaft 16 is supported on a carriage 17, and this carriage is guided to slide transversely on the table 18 surmounting a portion of the casing 1. In order to accomplish this and guide the carriage 17 in a straight line, I prefer to provide oppositely disposed rails 19 and 20 on the table 18, and on the under side of the carriage (see Fig. 1), and between these rails, anti-friction rollers 21 are provided. These rollers may be provided, if desired, with grooves at their points of contact with the rails 19 and 20.

The carriage is provided with means for urging it in a transverse direction; that is to say, in a direction to move the shaft 16 toward the shaft 3. The carrier head 14, of course, is rotating in a plane transverse to the plane of rotation of the wheels 2 and 4; that is to say, the carrier head rotates in a vertical plane.

In forming a bevel on a circular glass, the carrier head would be of circular form, but if it is desired to bevel a glass having a special form with a curvilinear edge that may be concave as well as convex, I employ a carrier head 14 having a pattern of the plate. Such a special design of head is illustrated in Fig. 4. This head presents convex curvilinear portions 19ª alternating with concave curvilinear portions 20ª. In beveling a glass of this kind, or of any irregular shape such as elliptical, the carriage 17 is arranged so that it is free to move to and fro on the track rails 19. By any suitable means such as a weight 21ª suspended on a cord 22, the carriage would be urged toward the vertical transverse plane passing through the axis of the shaft 3, but the position of the head 14 is determined at any instant by the use of a relatively fixed stop which, in the present instance, is in the form of a roller 23 that is mounted in a position to roll on the edge of the carrier head 14 (see Fig. 2). This roller may be secured on a removable bracket 24. When not beveling elliptical sheets of glass of special design, such as shown in Fig. 4, this bracket 24 could be removed if desired, and the head 14 would be held in a fixed position. In order to enable this to be accomplished, the carriage may be provided with an extension tail or tongue 25 provided with a plurality of holes 26 in any one of which a stop pin 27 may be dropped. This pin 27 would engage the edge of the table 18 (see Fig. 1) and cooperate with the weight 21a to hold the carriage in a fixed position.

In accordance with my invention, the carriage supports the carrier head 14 in such a way that if desired, the plane of rotation of the carrier head can be altered so as to vary the degree of the bevel that will be formed on the glass by the peripheral face 15 of the abrading wheel 2. In the present instance, in order to accomplish this, I prefer to mount the shaft 16 in a bearing bracket 28 having a pair of bearings 28a in which the shaft is rotatably mounted, and in which the shaft can be shifted longitudinally. This longitudinal shifting movement of the shaft is desirable in order to enable the carrier head 14 to be withdrawn from the immediate proximity of the wheel 2 to enable a beveled plate to be removed and a blank plate to be set in position for beveling. The bearing bracket 28 may be provided with a plurality of clamping bolts 29 (see Fig. 1) that pass through curved slots 30 formed in the carriage 17 (see Fig. 2). By loosening up these bolts 29, the bearing bracket can be rotated on a vertical axis coinciding with the vertical axis of the carriage, so as to adjust the carrier head 14 into any oriented position desired. This evidently enables the degree of the bevel to be altered as desired.

Although it will be evident that the suspended weight 21a would afford means for maintaining the edge of the plate against the abrading face of the wheel or stone 2, it should be understood that this weight 21a is intended primarily to be employed for holding the carrier head 14 against the roller 23 when beveling special shapes. It is preferable to provide a lighter and more sensitive means for pressing the carrier head 14 forwardly so as to maintain the edge of the glass against the grinding face. For this purpose I prefer to provide the rear end of the shaft 16 with a swivel head 31 having diametrically opposite pins 32 for engaging a forked end of the arm of a bell crank lever 33, said bell crank lever having a long arm 34 carrying an adjustable weight 35. This weight is secured in position by a set screw 36 that enables it to be secured at any desired position. In this way the amount of pressure of the plate 5 against the grinding wheel can be nicely regulated.

Carrier heads such as the carrier head 14, are usually of pneumatic type, and in the present instance, connection to this head is made at a swivel head on the end of the shaft 16 through a flexible hose 37 leading from a three-way cock 38, one side of which is connected by a pneumatic hose 39 to an air pump or other apparatus for exhausting air.

The pneumatic hose 37, of course, communicates with a central duct in the shaft 16. The three-way cock 38 has a port 40 opening to atmosphere, and when the lever 41 of this cock is placed in the "Off" position, the partial vacuum in the head 14 will be broken. This will enable the plate to be removed.

Pneumatic heads of this kind are, of course, common in the art. If the machine is employed for beveling very large and heavy sheets of glass, it may be necessary to make a special construction of the suction head, which will give several points of support for the plate including intermediate points to prevent any possibility of the air pressure on the outside of the plate, breaking it. In Figure 5 I illustrate a type of pneumatic head that may be employed, involving the use of an outer rim 42 of rubber, or similar cushioning material, and an inner ring 43 and an intermediate ring 44. The two latter rings have breaks or gaps 45 in them, so that the partial vacuum being established by the central port 46 in the head, will be communicated to all of the annular spaces between the rings.

Mechanism is provided for driving the shaft 16 to rotate the carrier head 14, and for this purpose I prefer to provide a motor 47 that drives gearing that will maintain connection with the shaft 16 in spite of its shifting movement back and forth, and supported on the carriage 17 so that when the bearing bracket 28 is shifted into different oriented positions to change the degree of bevel, the motor and drive to the shaft 16 will be maintained intact. For this purpose I prefer to mount the motor 47 on a motor frame 48, the inner end whereof is supported on the shaft 16 by means of a split collar 49 that can be attached loosely to the shaft 16 in any desired position, and this collar is connected to the motor frame, in the present instance, by means of an arm 50. The motor 47 drives a belt 51 (see Fig. 1) that drives a gearing within a reduction drive device 52 that drives a gear wheel 53 (see Fig. 2) that meshes with a gear wheel 54 splined on the shaft 16 and having a swivel connection with the split collar 49 so that it will shift on the shaft 16 when the collar is shifted.

The outer end of the motor frame 48 is preferably supported on anti-friction rollers 55 that roll on a shelf 56 projecting out from the side of the main housing of the bearing bracket 28.

The direction of the rotation of this motor is important because the outer end of the motor frame merely rests by gravity on the shelf 56, and the motor must rotate in such a direction that the reaction or thrust from the gear 54 will be in a downward direction. The corresponding direction of rotation for the gear 53 is clockwise, as viewed from the right side of Fig. 2.

In Figs. 7 and 8 I illustrate a plate of elliptical form, but in which a portion of the glass is cut away so that it does not present a continuous beveled edge. In accordance with my invention, I provide means for enabling the wheel 2 to form a bevel on a glass of this kind. This improvement particularly concerns a controlling means for the carrier head 14. Of course, it is obvious that where the curved edge of the glass being beveled is continuous, there is no difficulty about performing the beveling operation, but if there is a break in the continuity of the beveled edge, it is also obvious that when this break arrives at the grinding face of the wheel 2, the weight 35 on the lever 34 would push the shaft 16 forwardly as soon as the surface of the plate had passed out of contact with the face of the wheel 2. This would cause breakage of the glass. In accordance with my invention, I provide means for holding back or restraining the shaft 16 while this cutaway portion of an elliptical sheet of glass is passing the face of the wheel. This is accomplished preferably through the medium of a cam 57 (see Fig. 2) which is engaged by a roller 58 carried on an arm 59 that is secured to the shaft 16. This arm 59 is set in line with the break and just a little ahead of the same in respect to the direction of rotation, so that when the roller strikes the cam, the cam will hold the shaft 16 against being shifted forwardly, and as the roller rides off of the cam the shaft 16 will return to its normal position. In this way a plate of elliptical form, such as the plate 60 illustrated in Figs. 7 and 8 can be beveled throughout its curvilinear edge 61, and in spite of the presence of a straight edge or chord line 62 extending across one end of the plate.

After the wheel 2 has formed a beveled face on the edge of the glass, it is necessary, of course, to finish the extreme edge, and this is accomplished by means of a grooved edger wheel which engages the extreme edge of the beveled plate. Means is provided to enable this edger wheel to be yieldingly pressed against the edge of the plate. This may be accomplished by mounting the edger on a carriage that gravitates toward the plate, as illustrated in Fig. 6, or by mounting the edger wheel on an arm that is constrained to swing toward the glass plate.

Referring to Fig. 3, the carriage 17 is provided with an elevated frame structure 63 on which a bell crank lever 64 is mounted on a pivot pin 65, said lever carrying on its lower arm, a grooved edger wheel 66 that engages the beveled edge of the plate 5. The bell crank lever 64 may be constrained in a direction to hold the edger 66 against the plate 5 by a spring if desired, but this is preferably accomplished by providing an adjustable weight 67 secured on the upper arm of the bell crank lever, so that it can be secured in any desired position. This may be accomplished by means of a simple set screw 68.

The edger wheel 66 is driven at a suitable speed by means of a belt 69 passing over a belt pulley 70 rigid with the edger wheel 66 but preferably of a smaller diameter than the edger wheel. This belt is driven continuously by an electric motor 71 mounted on the frame 63.

In the construction illustrated in Fig. 6, instead of employing a bell crank lever for carrying the edger, the edger wheel 72 may be mounted on a carriage 73 having wheels or rollers 74 mounted on an inclined track 75. This track inclines slightly toward the position of the rotating plate 5a. The carriage 73 may have a motor 76, the belt 77 from which drives the edger wheel.

After the edger has operated upon the plate, the beveled face should be polished or burnished. This is accomplished by means of the wheel 4 having a face of cork or any other suitable finishing material. In Fig. 7 I illustrate the wheel 4 raised to substantially the level of the axis of rotation of the plate 60, the beveled edge of which is being finished. The inclination of the inclined track 75 may be regulated by means of an adjusting screw 78 mounted in the outer end of the track. The track may be pivotally supported as at 79.

The wheels 2 and 4 are preferably housed in a housing 80 which, if desired, may be used as a tank to hold water, and the different operations carried on below the water level; or, if desired, a water supply pipe 81 may be provided to deliver water at the grinding point.

The shaft 3 may be rotated by any suitable means, for example, by a plurality of small belts 82 running over a belt pulley 83 carried by this shaft.

It has been explained above in connection with Figure 2, how the angle of the bevel being cut on the edge of the glass 5 can be changed as desired, by reason of the presence of the slots 30 (see Figure 2) and bolts 29 that enable the bearing bracket 28 to be held in different angular positions to alter the angle of the axis of the shaft 16 with respect to the beveling wheel 2. However, this is not the only way that this change of bevel angle can be accomplished. It can also be accomplished by changing the position of the stop pin 27 in one of the holes 26 (see Figure 2). Suppose for example, that the machine as illustrated in Figure 2 is grinding a bevel on the edge of the glass 5 in the position indicated in Figure 2, the glass plate being circular. If it is desired to grind a second bevel or a bevel at a different angle, it is merely necessary to move the stop pin 27 into one of the holes 26 nearer to the center of the table. When this is done, this will stop the carriage in a position in which the axis of the shaft 16 will occupy a position such as that indicated by the line 84. When this is done, the glass plate will occupy the position indicated by the dotted lines 5a. In other words, the plane of rotation of the plate will be moved nearer to the axis of the grinding wheel 2, but without changing the angle of the axis of the shaft 16 with relation to the wheel 2. This enables bevels of different angles to be formed on sheets or glass plates, and also enables double bevels to be formed on them when desired. At this time of course, the cam arm 59 would be removed.

Referring to Figure 9, by employing a carrier head 85 formed with separate and independent suction chambers or cups 86, it is possible to support a plurality of flat glass sheets 87 on the same carrier head, so that the edges of these plates can be operated upon at the same time. Of course, in putting the two sheets 87 in place, they must be both put in position at the same time, because no partial vacuum can be developed in one of these suction cups unless the inlet from the atmosphere to the other side of the head is also cut off. In other words, in this type of construction, the head is formed in a plurality of sections corresponding to the number of sheets that are to be edged. In Figure 9 I have illustrated two such sections, but it should be understood that there may be more of these sections if desired. As illustrated in Figure 10, the main duct 88 through which the partial vacuum is maintained, is formed in the head 85 with a branch 89 corresponding to each section of the head.

In Figure 11 I illustrate guiding means for controlling the relative position of the glass and the grinding wheel, that avoids the necessity for employing the roller 23 and cooperating oval head 14, as in Figure 2. In the present instance, as illustrated in Figure 11, 90 represents a fixed bracket that projects toward the location of the rotary head 91, and this bracket at about the level of the middle plane of the grinding wheel 92, pivotally supports a two-armed yoke 93 the arms of which carry rollers 94 that engage the periphery of the glass plate 95. The shaft 96 of the carrier head is, of course, mounted in a carriage similar to the carriage 17 that is yieldingly urged forwardly in a direction to maintain the edge of the glass plate in contact with the beveling wheel. As the plate rotates, the yoke 93 rocks on its pivot pin 97 and limits the extent to which the glass plate can contact with the face of the grinding wheel.

A modification of this type of guiding means for the edge of the glass plate is illustrated in Figure 13, in which I dispense with one of the rollers 96, preferably the lower roller, and the "yoke" becomes a single arm 98 which is attached to the end of the bracket arm 99 by an adjusting bolt 100. In other words, by loosening up the nut 101 of this bolt, the arm 98 can be adjusted toward the right or toward the left, as viewed in Figure 13. In this figure the roller 102 is represented as resting against the periphery of an octagonal glass plate 103. As the glass plate rotates on its axis of rotation, its edge will be presented to the face of the grinding wheel 104, which will bevel the edge. Of course, the width of the bevel will vary slightly, but it will be regular and symmetrical, and therefore unobjectionable.

It is found in practice that while the edger mechanism illustrated in Figures 3 and 6 operate satisfactorily, nevertheless in Figure 14, I illustrate a mounting for the edger wheel 105 in which the arm 106 carrying the edger wheel is not only urged toward the glass sheet 107 by the counterweight 108, but the arm 106 is mounted on a support in such a way that the support itself is yieldingly urged toward the glass. Any suitable means may be employed for this purpose, but in the present instance the pivotal support 109 for the arm 106 is mounted on a carriage 110 that can gravitate down an inclined guide or track 111 which is inclined to the horizontal plane, and this construction preferably includes means for adjusting the angle of inclination of the track 111. For this purpose the forward end of track or guide 111 will be mounted for rotation on a horizontal shaft 112, and means such as the adjusting screw 113 is provided, threaded through a fixed table 114 for raising or lowering the track. For this purpose the upper end of the screw 113 carries a swivel head 115 with oppositely projecting pins 116 received in corresponding slots such as the slot 117.

The general mode of operation of the apparatus will now be described. In beveling circular plates, the plate such as the plate 5, is applied to a circular head such as the head 14 shown in Fig. 2. In beveling the circular head, the stop roller 23 is not employed, but the carriage 17 is held in a fixed position by means of the pin 27 that is dropped into one of the openings 26 in the tongue 25 so as to engage the edge of the table as illustrated in Fig. 1. This holds the carriage 17 in a fixed position, and the position of the pin 27 would depend upon the diameter of the plate that is to be beveled. By means of the pin 27 the carriage 17 will be held in a relation such as that illustrated in Fig. 2, so that when the shaft 16 is projected forwardly it can press the edge of the plate yieldingly against the peripheral face 15 of the wheel 2. The weight 35 on the arm 34 of the bell crank lever 33 exerts a yielding force on the shaft 16 to maintain the edge of the plate against the face of the beveler wheel.

If it is necessary to bevel a glass of special form not having a continuous curved edge, for example, a plate having a form such as that illustrated in Figure 8, the cam 57 is put in position to cooperate with the roller 58 on the arm 59 carried by the shaft 16. If this cam is employed when the roller 58 strikes the cam, it will prevent the carrier head 14 from pushing forward into the gap or break formed by the chord line 62.

If a glass of special design having convex edges must be beveled, the plate which is cut approximately to the desired shape, is mounted on a carrier head having a corresponding shape, such as that illustrated in Figure 4. In beveling such a special form of plate, the stop roller 23 is employed against which the edge of the carrier head 14 rests, being held yieldingly against the same by the weight 21 and cord 22. The roller 23 is, of course, approximately at the level of the shaft 16, and as the carrier head 14 rotates, the roller 23 cooperates with the suspended weight 21 to keep the shaft 16 at approximately the proper position to present the edge of the glass to the grinding face 15.

Of course, in doing this type of beveling, it may be necessary to employ a grinding wheel 2 of much smaller thickness than that illustrated in Fig. 1, and also it may be necessary to employ a grinding wheel with a curved grinding face.

In using the edger wheel 72 as illustrated in Fig. 6, it should be understood that this edger wheel presses itself by gravity against the edge of the glass plate 5a.

Of course, the arm 59 of cam 57 is disconnected so as not to be used when beveling any plates, except a "chord-line" plate of the type shown in Fig. 8.

Although in the construction of this machine I have generally employed the action of gravity for enabling the cutting wheel and the glass to be urged relatively toward each other, it should be understood that I do not limit myself to this particular means for this purpose as it is obvious that pneumatic means or a spring could be employed to perform this function.

Many other embodiments of this invention may be resorted to without departing from the spirit of the invention.

What I claim is:

1. In a machine for beveling a glass having a periphery conforming to a predetermined curved pattern characterized by curvilinear projections and curvilinear depressions, the combination of a frame, a rotary abrading wheel mounted to rotate in a substantially horizontal plane, a carriage guided to move laterally, a rotary carrier head mounted on the carriage for carrying the plate, said head having a curved outline corresponding to the desired predetermined pattern, a relatively fixed stop, means for yieldingly pressing the carriage laterally to maintain the periphery of the said head against the relatively fixed stop and so that the edge of the plate to be beveled is applied to the periphery of the abrading wheel, means for guiding said head to slide longitudinally on its axis of rotation toward or from the abrading wheel, and means for yieldingly urging the carrier head toward the abrading wheel.

2. In a glass beveling apparatus, the combination of a frame, an abrading wheel mounted to rotate on a substantially vertical axis, a carriage guided to move transversely on the frame, a bearing bracket supported on the carriage, a carrier head for carrying a glass to be beveled and having a substantially horizontal shaft rotatably mounted in the bearing bracket, a motor frame supported on the shaft at its inner side and supported on the carriage at its outer side for movement with the shaft when the same is moved longitudinally, and gearing for driving the shaft from the motor.

3. In a glass beveling apparatus, the combination of a frame, an abrading wheel mounted to rotate on a substantially vertical axis, a carriage guided to move transversely on the frame, a bearing bracket supported on the carriage, a carrier head for carrying a plate to be beveled and having a substantially horizontal shaft rotatably mounted in the bearing bracket, a motor frame attached at its inner side to the said shaft, means at the outer side of said motor frame for supporting the same on the carriage to enable the motor frame to move with the shaft when the same is moved longitudinally, gearing for driving the shaft from the motor, said motor having a direction of rotation such that the reaction upon the same in driving the gearing holds the outer end of the motor frame down on the carriage.

4. In a machine of the class described, the combination of a grinding wheel, means for supporting and rotating the plate to be beveled, means for exerting a yielding force in a direction to bring the wheel and the plate relatively toward each other and into contact, and guiding means including a freely mounted pivoted yoke and a pair of guide rollers carried by the said yoke, to engage the edge of the plate, and rotating in substantially the same plane and operating to rock on its pivot while controlling the contact between the grinding wheel and the plate during the rotation of the plate.

5. In a machine of the class described, the combination of a grinding wheel, means for rotatably supporting a glass plate to be beveled by the said wheel, means for exerting a yielding force in a direction to bring the plate and the grinding wheel into contact with each other, a pivoted arm, a guide wheel carried thereby, engaging the edge of the plate for limiting the degree of contact between the plate and the grinding wheel, and adjustable means for securing the said guide arm and wheel in different positions to enable the same to cooperate with plates of different shapes.

6. In a machine of the class described, means for supporting and rotating a glass sheet to be edged, an edger wheel to engage the edge of the glass, an edger arm in which the edger wheel is rotatably mounted, means for supporting the edger arm so that the point of support for the arm is urged in the direction of the glass, means for urging the arm to swing on its supporting means toward the glass, and means for driving the edger wheel.

7. In a glass beveling apparatus, the combination of a frame, an abrading wheel mounted to rotate on a substantially vertical axis on the frame, a carriage guided to move transversely on the frame, a rotary head mounted for rotation on said carriage on a substantially horizontal axis for holding the glass to be beveled with its edge in position to touch and to be ground by the vertical face of the abrading wheel, means for urging the carriage toward the abrading wheel, said carriage having a plurality of sockets and a stop pin to be received in any one of the said sockets to engage a part of the frame and thereby restrain the carriage and limit the degree of contact of the glass with the face of the beveler wheel.

KARL WEBER.